US011743923B1

(12) United States Patent
Thantharate et al.

(10) Patent No.: US 11,743,923 B1
(45) Date of Patent: Aug. 29, 2023

(54) DYNAMIC RADIO RESOURCE PROVISIONING BASED ON NETWORK CAPABILITY PARAMETER

(71) Applicant: T-MOBILE INNOVATIONS LLC, Overland Park, KS (US)

(72) Inventors: Anurag Thantharate, Overland Park, KS (US); Ryan C. Lindstrom, Olathe, KS (US); Hannah J. Sifuentes, Lee's Summit, MO (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 168 days.

(21) Appl. No.: 17/083,052

(22) Filed: Oct. 28, 2020

(51) Int. Cl.
*H04W 72/51* (2023.01)
(52) U.S. Cl.
CPC .................................. *H04W 72/51* (2023.01)
(58) Field of Classification Search
None
See application file for complete search history.

(56) References Cited

U.S. PATENT DOCUMENTS

| 8,428,552 | B1 * | 4/2013 | Daniels | H04M 15/772 |
| | | | | 455/406 |
| 2011/0237238 | A1 * | 9/2011 | Hassan | H04M 15/8061 |
| | | | | 455/422.1 |
| 2016/0241994 | A1 * | 8/2016 | Iguchi | H04W 4/029 |
| 2017/0064600 | A1 * | 3/2017 | Abuelsaad | H04L 41/00 |
| 2019/0116570 | A1 * | 4/2019 | Kishiyama | H04W 4/40 |
| 2019/0297487 | A1 * | 9/2019 | Muñoz Sanchez | H04W 8/20 |
| 2020/0154267 | A1 * | 5/2020 | Soriaga | H04L 5/0057 |
| 2021/0204300 | A1 * | 7/2021 | Hu | H04W 72/0446 |
| 2021/0242913 | A1 * | 8/2021 | Manolakos | H04B 7/043 |
| 2021/0258132 | A1 * | 8/2021 | Huang | H04L 5/0053 |
| 2021/0289573 | A1 * | 9/2021 | Greene | H04L 27/3494 |
| 2022/0030044 | A1 * | 1/2022 | Garg | H04W 28/20 |
| 2022/0038380 | A1 * | 2/2022 | Smith | H04L 47/2483 |
| 2022/0131595 | A1 * | 4/2022 | Khan | H04B 7/0874 |
| 2022/0304024 | A1 * | 9/2022 | Maleki | H04L 5/0023 |

FOREIGN PATENT DOCUMENTS

| CA | 2813073 | A1 | * | 9/2011 | ............. | H04W 4/08 |
| CN | 109286602 | A | * | 7/2017 | ............. | H04L 67/54 |
| EP | 2822247 | A1 | * | 1/2015 | ............. | H04L 29/08 |
| JP | 2006033139 | A | * | 7/2004 | ......... | H04N 21/2402 |

* cited by examiner

*Primary Examiner* — Jeffrey M Rutkowski
*Assistant Examiner* — Ning Li

(57) ABSTRACT

A method of provisioning radio resources to a user equipment (UE) by a cell site. The method comprises receiving by a cell site an indication of a UE capability from a UE, determining by the cell site a value of a network capability parameter to associate to the UE that is less than a maximum value of the network capability parameter that is compatible with the UE capability category of the UE, wherein the determining is based on a subscription service plan associated with the UE, and providing radio resources to the UE by the cell site based on the determined value of the network capability parameter, wherein the network capability parameter defines one of a radio modulation level, a carrier aggregation (CA) state, and a multiple input multiple output (MIMO) state.

7 Claims, 9 Drawing Sheets

DYNAMIC RADIO RESOURCE PROVISIONING BASED ON NETWORK CAPABILITY PARAMETER

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Wireless communication networks provide nearly ubiquitous connectivity to a wide variety of wireless devices including mobile phones, wearable computers, laptop computers, and intelligent devices embedded in vehicles and other machines. These various mobile communication devices may each have different capabilities for using wireless resources, in terms of frequencies, frequency bandwidths, modulation techniques, and data rates.

SUMMARY

In an embodiment, a method of provisioning radio resources to a user equipment (UE) by a cell site is disclosed. The method comprises receiving by a cell site an indication of a UE capability from a UE, receiving by the cell site an indication from the UE of an application currently being used by the UE, and determining by the cell site that the UE is opted in for assignment of radio resources to the UE that are less than the maximum radio resources consistent with the UE capability of the UE. The method further comprises determining by the cell site a value of a network capability parameter to associate to the UE that is less than a maximum value of the network capability parameter that is compatible with the UE capability of the UE, wherein the determining is based on a subscription service plan associated with the UE and based on the application being used by the UE and providing radio resources to the UE by the cell site based on the determined value of the network capability parameter.

In another embodiment, a user equipment (UE) is disclosed. The UE comprises a radio transceiver, a processor coupled to the radio transceiver, a non-transitory memory coupled to the processor, and a service selection application stored in the non-transitory memory. When executed by the processor the service selection application analyzes a history of data usage of the UE while executing an application and, based on the analysis of the history of data usage, estimates a future data usage when executing the application by the UE. The service selection application further estimates a data service price based on the estimate of future data usage when executing the application and presents a user interface presenting a plurality of different network capability parameter values and for each network capability parameter value presents a data service price based on the estimated data service price. The service selection application further receives a user input selecting one of the network capability parameter values and transmits an indication of the user selected network capability parameter value to a serving cell site, whereby the UE promotes a user controlling radio resource allocation by the cell site to the UE in a range from a maximum radio resource allocation consistent with a maximum UE capability of the UE to a minimum radio resource allocation supported by the cell site.

In yet another embodiment, a method of provisioning radio resources to a user equipment (UE) by a cell site is disclosed. The method comprises receiving by a cell site an indication of a UE capability from a UE, determining by the cell site a value of a network capability parameter to associate to the UE that is less than a maximum value of the network capability parameter that is compatible with the UE capability of the UE, wherein the determining is based on a subscription service plan associated with the UE, and providing radio resources to the UE by the cell site based on the determined value of the network capability parameter, wherein the network capability parameter defines one of a radio modulation level, a carrier aggregation (CA) state, and a multiple input multiple output (MIMO) state.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
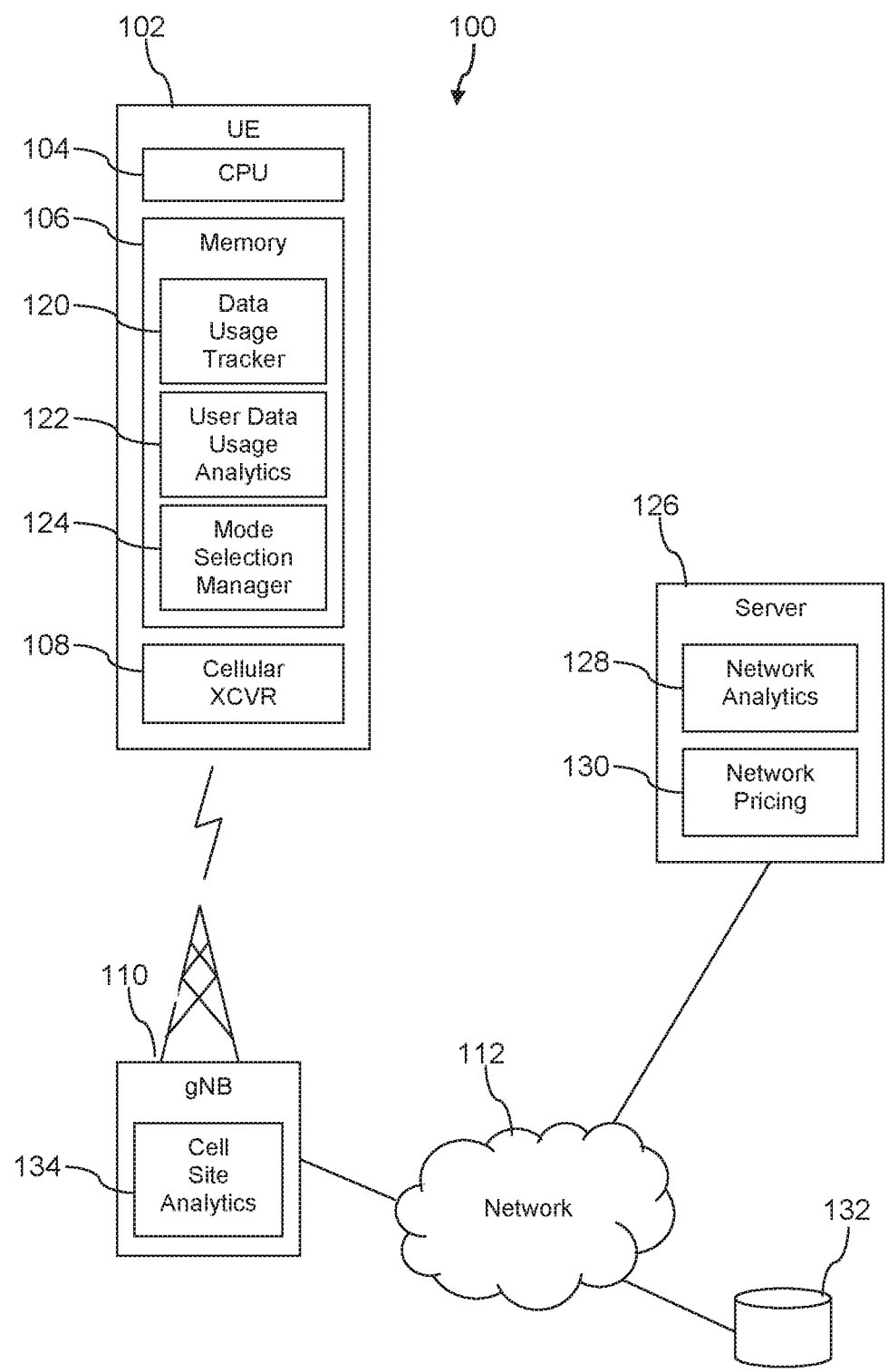
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

During attach of a user equipment (UE) to a cell site (e.g., a gigabit enhanced nodeB (gNB)), the cell site assigns the UE a network capability parameter that the cell site uses to allocate radio resources and/or communication resources to the UE. For example, the cell site may decide based on the network capability parameter whether to configure the wireless link for multiple input multiple output (MIMO) radio operations, for carrier aggregation (CA) operation, for a 16-quadrature amplitude modulation (QAM), a 64-QAM, or 256-QAM operation. Conventionally this network capability is assigned by the cell site based on an appraisal or estimation of the hardware capabilities of the UE. The UE may provide information to the cell site describing in various ways its hardware capabilities, for example identifying its ability to conduct MIMO operations, its ability to engage in CA operations, a maximum QAM constellation that it supports, a chipset installed in the UE, and/or other hardware capabilities. In an embodiment, the UE may provide information describing its hardware capabilities by sending UE capability information in a radio resource control (RRC) message sent by the UE to the cell site.

Conventionally, the cell site assigns a network capability parameter to the UE that reflects the maximum hardware capabilities of the UE. This can result in excess radio resources being allocated to the UE by the cell site. For example, just because the UE may be able to support MIMO doesn't mean that the cell site ought to allocate MIMO operation resources to the UE. For example, it may be that a given UE, during a working day, historically only uses voice call and text message services (because the user may rely on his or her laptop computer connected to a LAN for ad hoc data access services instead of his or her UE). In many circumstances, allocating MIMO operation resources to the UE for voice and text message services is unnecessary and may make these MIMO operation resources unavailable for use by another UE attached to the same cell site. The present disclosure teaches a system for determining network capability parameter assignment based on a more sophisticated analysis of UE needs, based not only on the maximum hardware capabilities of the UE but additionally on other factors such as one or more of a historic pattern of UE usage of radio resources, a subscription plan of the subscriber, an identity of an application currently in use by the UE, an estimation of current network loading, a current value of a dynamically assessed data volume service fee, and/or user opt-in actions.

An application or SDK on the UE will aggregate application data usage statistics, measure the data volume and/or data rate that the applications consume, and track what applications a user is using and when the user is using them. This application or SDK may be referred to as a data usage tracker application. A usage analytics application on the UE will analyze the aggregated data usage statistics and produce estimates of data usage for the user—for example data traffic consumed by each different application executed on the UE. The estimates may distinguish between down-link data throughput and up-link data throughput. These usage estimates may be referred to as usage analytics. The UE provides these usage analytics periodically to a central server maintained by a service provider. In an embodiment, this central server may select the network capability parameter value to assign to the UE based on the associated usage analytics for the UE as well as based on the information about the hardware capabilities of the UE (again, effectively establishing a maximum) and based on historical network loading. Alternatively, the central server may provide the usage analytics to the cell sites, and the cell site to which the UE attaches may determine the network capability parameter value to assign to the UE, based on the usage analytics, based on the hardware capabilities of the UE, based on historical network loading, and based on capabilities of the specific cell site.

In an embodiment, the UE may provide a user interface that a user can use to opt-in or to opt-out to granting the communication network (e.g., the cell site and/or servers in the carrier core network) the prerogative to assign the network capability parameter value to the UE based not only on the maximum hardware capabilities of the UE but additionally based on the other considerations of usage analytics of that UE, historical network loading, and/or other factors. Additional factors may include time of day, day of week, an indication of which application is executing on the UE, and a location of the UE. Because use of maximum hardware capabilities can sometime correlate with incurring higher service fees, for example in pre-paid service accounts and/or in post-paid service accounts with a maximum monthly data limit, this can incentivize users to be sparing in their usage of the network resources. Alternatively, this can be seen as allowing users to prioritize where they allocate their expenditures on data. For example, a user may opt in to restrict data bandwidth associated with SMS/MMS message (who needs all the pictures and silly videos of squirrels water skiing or what have you) but NOT opt in to restrict data bandwidth associated with streamed audio. In an embodiment, user interface may be provided by a mode selection manager application, and the mode selection manager application may itself determine a recommended network capability parameter value and send this to the cell site. The mode selection manager application may provide information to the user when an application is launched that indicates an average data communication usage of the application based on usage analytics information and prompt the user to either request increased radio resources from the cell site to assure a good user experience when using the application or to reduce radio resources provided by the cell site whereby to reduce a data volume based fee to the subscriber. Alternatively, the mode selection manager application may evaluate the average data communication usage of the application based on usage analytics information, compare that to the current radio resources allocated to the UE, and prompt the user to request increased radio resources, decreased radio resources, or remain silent and not notify the user at all when the currently allocated radio resources match the expected data usage of the application.

The new process disclosed herein for determining the network capability parameter value and the optional behavior of prompting the user to opt-in or opt-out of determining the network capability parameter value according to this process provide a particular information technology (IT) solution or solutions for allocating radio resources to UEs. This particular IT solution involves coordination among applications executing on the UE and with the cell sites and possibly with network servers. Describing abstractly and without reference to particular embodiments, a new monitoring tool on the UE and a new analysis tool on the UE provide a more complex suite of data including history by time by application by location or combinations of these. A decision tool (on the UE, at the cell site, or in the back office) assesses the combination of type of device and maximum capability plus history plus user input (if opt in/opt out is provided) to set a max level for a given app by location by time (or some combination). An application at the cell site watches for changes in application executing on the UE, changes in location of the UE, takes time into consideration and may upgrade or downgrade an ongoing or recurrent connection to the calculated level for that UE. Data from sent from the UE to the cell site may be modified to include as metadata for the attachment of the UE to the cell site. In an embodiment, the UE side solution involves a data usage tracker, a usage analytics application, and optionally a mode selection manager application. In an embodiment, the network side solution involves at least a cell site analytics application executing on the cell site that applies more sophisticated rules for allocating radio resources to the UE. This particular IT solution provides benefits of promoting more efficient distribution of limited and costly radio resources in a wireless communication network while at the same time supporting user preferences for quality communication services.

Turning now to FIG. 1, a communication system 100 is described. In an embodiment, the system 100 comprises a user equipment (UE) 102 that communicates via a cell site 110 and a network 112 to other communication nodes such as mobile phones, content servers, application servers, or other communication destinations. The UE 102 may be a mobile phone, a smart phone, a personal digital assistant (PDA), a wearable computer, a headset computer, a laptop computer, a tablet computer, or a notebook computer. The UE 102 comprises a processor 104, a memory 106, and a cellular radio transceiver 108. The UE 102 may be provided a wireless link by the cell site 110 using a 5G, a long term evolution (LTE), a code division multiple access (CDMA), or a global system for mobile communication (GSM) telecommunication protocol. In an embodiment the cell site 110 is a gigabit enhanced node B (gNB) cell site and the network 112 comprises, at least in part, a 5G communication network. Further details of 5G communication networks are described hereinafter with reference to FIG. 6A and FIG. 6B. The network 112 may comprise one or more public networks, one or more private networks, or a combination thereof. While only a single UE 102 and a single cell site 110 are shown in FIG. 1, it is understood that the system 100 comprises any number of UEs 102 and any number of cell sites 110.

The memory 106 comprises a non-transitory portion. In an embodiment, the non-transitory portion of the memory 106 comprises a data usage tracker application 120, a user data usage analytics application 122, and a wireless communication mode selection manager application 124. In an embodiment, the data usage tracker application 120 may be considered to be a part of an operating system (OS) of the UE 102, for example a utility embedded in the OS that provides an application programming interface (API) that other applications can use to request information from the data usage tracker application 120. While the applications 120, 122, 124 are illustrated as separate applications, in an embodiment, two or more of the applications 120, 122, 124 may be combined in a single application. For example, in an embodiment, the data usage tracker application 120 may be a separate application (for example embedded in the OS of the UE 102) and the functionality associated with the user data usage analytics application 122 and the functionality associated with the wireless communication mode selection manager application 124 may be combined in a single application. In an embodiment, all of the functionality associated with the applications 120, 122, 124 may be combined in a single application.

When the UE 102 and or the cellular radio transceiver 108 attach to the cell site 110, the cell site 110 may allocate radio resources to the UE 102 based on a network capability parameter associated with that specific UE 102. The network capability parameter may be assigned by a server 126 communicatively coupled to the network 112 or by the cell site 110. The network capability parameter may be established by the cell site 110 based on a recommended network capability parameter provided by the wireless communication mode selection manager application 124 of the UE 102. The cell site 110 may use the network capability parameter to determine, at least in part, what radio communication resources to allocate to the UE during the attach process. In part, the cell site 110 determines what radio communication resources to allocate to the UE based on the radio communication resources it is capable of providing. If the network capability parameter associated with the UE 102 might suggest the use of 128-QAM, for example, but the cell site 110 supports a maximum of 64-QAM, the cell site 110 cannot allocate 128-QAM radio resources to the UE 102. The cell site 110 may determine what radio communication resources to allocate to the UE 102 in part on other factors, for example based in part on a network congestion condition of the network 112.

The allocation of radio communication resources for the wireless link to the UE 102 may comprise the designation of a modulation scheme, for example a modulation scheme selected from 16-quadrature amplitude modulation (16-QAM), 64-QAM, and 128-QAM. The allocation of radio communication resources for the wireless link to the UE 102 may comprise the designation of a multiple input, multiple output (MIMO) mode, for example defining how many inputs and how many outputs to use or for example defining that MIMO is not to be used and a single input, single output mode is to be employed. The allocation of radio communication resources for the wireless link to the UE 102 may comprise designating a carrier aggregation (CA) mode to use. The allocation of radio communication resources for the wireless link to the UE 102 may comprise designating properties of the wireless uplink from the UE 102 and of the wireless downlink to the UE 102. The allocation of radio communication resources for the wireless link to the UE 102 may comprise designating quality of service (QoS) levels for the wireless link to the UE 102.

In a first embodiment, the network capability parameter may be determined by the server 126; in a second embodiment, the network capability parameter may be determined by the cell site 110; in a third embodiment, the network capability parameter may be determined by the UE 102. Whatever entity determines the network capability parameter, this determination can be based on a plurality of different factors. The network capability parameter is based, in part, on the hardware capabilities of the UE 102. The hardware capabilities of the UE 102 may be indicated by the UE 102 sending UE capability information in a radio resource control (RRC) message to the cell site 110 or by another message. The cell site 110, in an embodiment, may send this UE capability information on to the server 126. The UE capability information may identify a chipset installed in the UE 102, for example an identity of the processor 104 and/or of the cellular radio transceiver 108. The UE capability information may identify an antenna configuration of the UE 102. The UE capability information may identify a maximum QAM constellation capability of the UE 102. The UE capability information may identify radio frequency bands supported by the cellular radio transceiver 108.

The UE capability information may be considered to influence the determination of the network capability parameter by setting a maximum value of the network capability parameter. For example, if the UE 102 is limited to a maximum QAM constellation of 64-QAM, it would not be suitable to set a network capability parameter for the UE 102 that defines or is associated with a 128-QAM modulation scheme. As another example, if the UE 102 is unable to support CA operation, it would not be suitable to set a network capability parameter for the UE 102 that defines or is associated with a CA operation mode. Just because a UE 102 may be capable of using advanced radio resources, however, doesn't mean that the UE 102 will in fact make use of those advanced radio resources, and in that circumstance it may be an inefficient allocation of limited radio resources to allocate advanced radio resources to the UE 102 when it will not use them. For example, if a UE 102 that is able to support all advanced radio resources is used only for conducting voice calls and text messaging in a business park with excellent cellular radio coverage during the work day, it may not be efficient to allocate advanced radio resources to the UE 102 during the work day. By contrast, if the same UE 102 is frequently used for conducting high data throughput video games between 9 PM and 11 PM in a rural area with sketchy cellular radio coverage, then allocating advanced radio resources to the UE 102 may be desirable during the hours 9 PM to 11 PM.

The present disclosure teaches taking into account an estimation of the UE 102 use of radio resources in determining the network capability parameter for the UE 102. The estimation may be based on an analysis of historical data volumes and/or data rates used by the UE 102 per time partition and per day of week. The estimation may be based on an analysis of historical data volumes and/or data rates used by specific applications on the UE 102.

The data usage tracker 120 collects data on the wireless data volumes and/or wireless data rates used by the UE 102 and stores this information in the memory 106. This data, which may be referred to as usage data, may be accumulated and/or counted per unit of time, for example as counts of data bytes over a 10 minute time period, counts of data over a 30 minute time period, counts of data over an hour time period, or counts of data over some other time period. The data usage tracker 120 may segregate data counts per application, so that usage data related to using a first application on the UE 102 is stored separate (e.g., in separately addressable portions of the memory 106) from the usage data related to using a second application on the UE 102.

The user data usage analytics application 122 requests data (e.g., usage data, counts of data used by the UE 102 per unit of time and possibly separated by application) from the data usage tracker application 120 and analyzes this data to develop estimates of data usage for different time slots or partitions and for different days of weeks. Thus the user data usage analytics application 122 may develop estimates for data usage by the UE 102 for each of 24 hour-long time slots of a day. The user data usage analytics application 122 may develop estimates for data usage by the UE 102 for each of 24 hour-long time slots of weekdays, other estimates for data usage by the UE 102 for each of 24 hour-long time slots of Saturdays, and other estimates for data usage by the UE 102 for each of 24 hour-long time slots of Sundays. The user data usage analytics application 122 may develop estimates for data usage by the UE 102 for each different application that executes on the UE 102 and that engages in wireless communication with the network 112 via the cellular radio transceiver 108. The user data usage analytics application 122 may develop estimates for data usage by the UE 102 for each different application for each of a plurality of time intervals. These estimates of data usage may be referred to as usage analytics.

Based on this kind of usage analytics, given a day of the week and a time slot (e.g., in an API call sent to the user data usage analytics application 122), the user data usage analytics application 122 can output an estimate of a data usage of the UE 102 on that day of the week and during that time slot. Based on this kind of usage analytics, given an application executing on the UE 102, the user data usage analytics application 122 may output an estimate of a data usage of the UE 102 when the subject application is executing.

In an embodiment, the user data usage analytics application 122 sends usage analytics data to a data store 132 via the cell site 110 and the network 112. The usage analytics data that the UE 102 sends to the data store 132 may comprise the estimates of data usage of the UE 102 for each different combination of day of the week and time slot. The usage analytics data that the UE 102 sends to the data store 132 may comprise the estimates of data usage of the UE 102 when executing each of the applications that execute on the UE 102. In an embodiment, the usage analytics data that the UE 102 sends to the data store 132 may comprise data about when the UE 102 executes different applications and for how long. Because the system 100 may comprise any number of UEs 102, it is understood that the data store 132 may store usage analytics data from a large number of different UEs 102. The user data analytics application 122 may also store the usage analytics data locally in the memory 106. In an embodiment, the user data analytics application 122 grooms the usage analytics data stored in the memory 106 by deleting usage data that has aged out by exceeding a maximum pre-defined age threshold.

In an embodiment, the server 126 comprises a network analytics application 128 and a network pricing application 130. The network analytics application 128 may access usage analytics data placed in the data store 132 by a large plurality of UEs 102. The network analytics application 128 may analyze the usage analytics to determine norms of usage data for different categories of UEs 102 and/or subscribers. These norms of usage data may be used to make projections for use with UEs 102 that do not provide any usage analytics. The network analytics application 128 may also determine network capability parameter values for at least some UEs 102. The network analytics application 128 may transmit the network capability parameter values for the UEs 102 to a plurality of cell sites 110. Alternatively, the network analytics application 128 may store the network capability parameter values it determines for the UEs 102 in the data store 132, and cell sites 110 may access data store 132 to look up a network capability parameter value when the UE 102 initiates an attach process.

In an embodiment, the cell site 110 comprises a processor that executes a cell site analytics application 134. The cell site analytic application 134, in response to the UE 102 initiating an attach process with the cell site 110, may access to data store 132 to look up usage analytics data placed in the data store 132 by the UE 102. The cell site analytics application 134 may analyze the usage analytics data associated with the UE 102 to determine the network capability parameter value for the UE 102. In an embodiment, the cell site analytics application determines the radio resources to allocate to the UE 102 during an attach process.

In an embodiment, the UE 102 further comprises a mode selection manager 124 that can provide an interface to a user of the UE 102 to select an option to authorize the cell site 110 and/or the network 112 (e.g., the operator of the network 112) to assign a network capabilities parameter value to the UE 102 that is less than the maximum compatible with the hardware capabilities of the UE 102. If the UE 102 does not select this option—does not "opt in"—the cell site 110 and/or the network 112 determines the network capability parameter solely based on the hardware capabilities of the UE 102 and to assign the maximum value network capability parameter consistent with the hardware capabilities of the UE 102. If the UE 102 opts-in, however, the cell site 110 and/or the network 112 are authorized to determine the network capabilities parameter as described further above—based on usage analytics providing estimations of data usage of the UE 102 at the current time, on the current day of the week, and/or while executing an application currently executing on the UE 102.

In an embodiment, the server 126 executes a network pricing application 130 that calculates a dynamic wireless communication service fee that is based on different levels of radio resources allocated to a UE 102 and based on current or historical network traffic loads. The mode selection manager application 124 can request a current price quote from the network pricing application 130, for example indexed to one or more data volume, data rates, and radio resource configurations. The mode selection manager application 124 can present pricing information to the user of the UE 102 and prompt the user to opt-in in order to access a reduced price associated with the mode selection manager application 124 negotiating with the cell site 110 and/or the network analytics application 128 to be assigned a network capabilities parameter value that is less than the maximum value consistent with the hardware configuration of the UE 102. The mode selection manager application 124 can choose which of a possible plurality of different prices points to present to the user based on usage analytics. For example, the mode selection manager application 124 may know that between noon and 4 PM the UE 102 consumes little data volume and hence prompts the user to opt-in and select a network capability parameter value that is consistent with a low data volume and a correspondingly low price point. The mode selection manager application 124 may know that between 9 PM and 11 PM the user streams video which consumes data at a high rate. The mode selection manager application 124 may present a selection to opt-out (which would lead to the cell site 110 assigning the network capabilities parameter value consistent with the hardware capabilities of the UE 102) or to select a pricing option that corresponds to a higher data volume and rate and more advanced radio resource allocation from the cell site 110.

Figure 2:
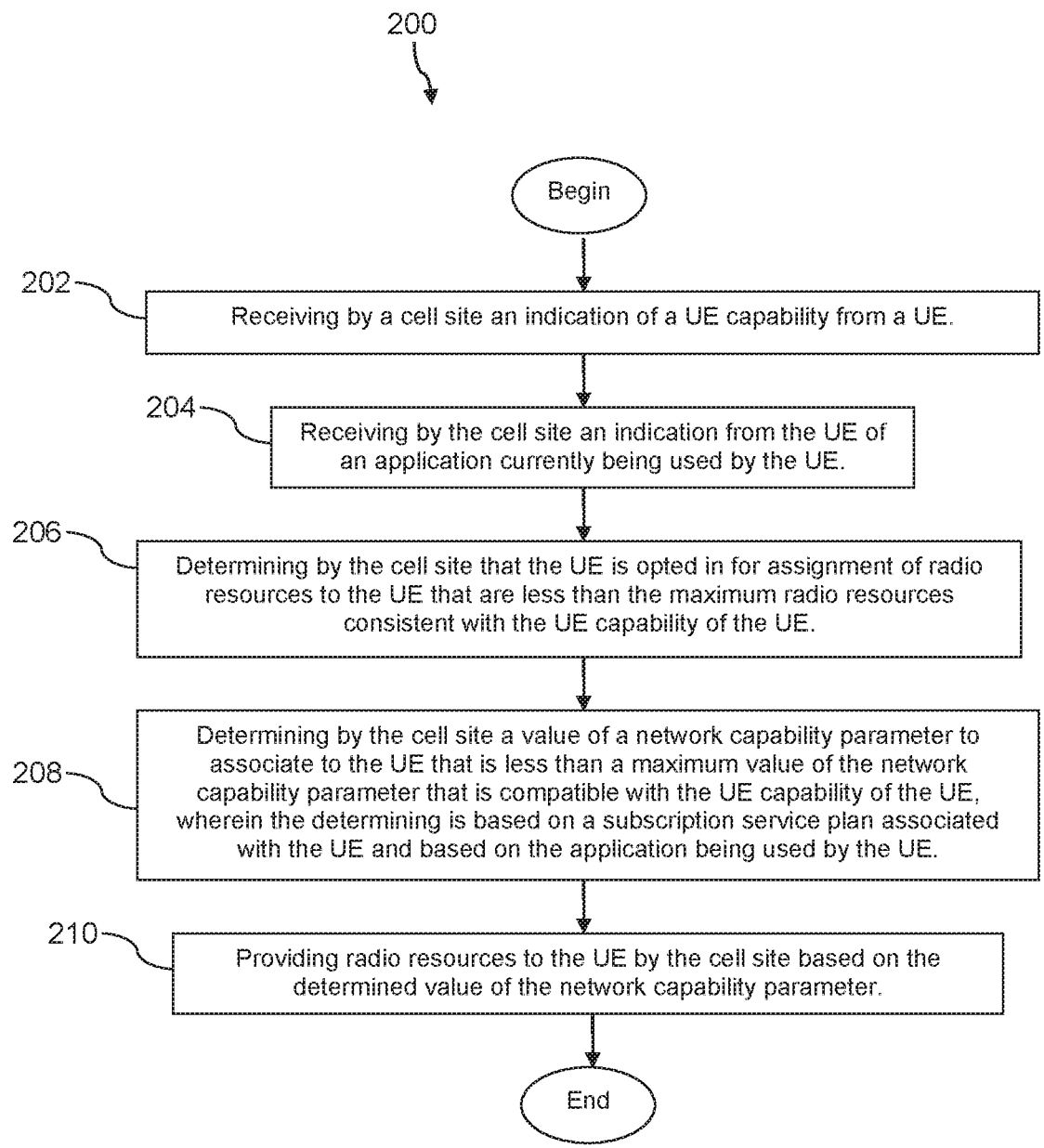
FIG. 2 is a flow chart of a method according to an embodiment of the disclosure.

Turning now to FIG. 2, a method 200 is described. In an embodiment, method 200 is a method of provisioning radio resources to a user equipment (UE) by a cell site, At block 202, the method 200 comprises receiving by a cell site an indication of a UE capability from a UE. At block 204, the method 200 comprises receiving by the cell site an indication from the UE of an application currently being used by the UE.

At block 206, the method 200 comprises determining by the cell site that the UE is opted in for assignment of radio resources to the UE that are less than the maximum radio resources consistent with the UE capability of the UE. For example, the mode selection manager application 124 described above with reference to FIG. 1 provides this information to the cell site. At block 208, the method 200 comprises determining by the cell site a value of a network capability parameter to associate to the UE that is less than a maximum value of the network capability parameter that is compatible with the UE capability of the UE, wherein the determining is based on a subscription service plan associated with the UE and based on the application being used by the UE. The decision making process of the cell site may include other factors such as a time of day, a day of week, a historic data usage of the UE while executing the subject application (as reported by the user data usage analytics application 122 executing on the UE 102 using data supplied to it by the data usage tracker application 120 executing on the UE 102. The cell site may further make its determination based on current data traffic loads in the network.

At block 210, the method 200 comprises providing radio resources to the UE by the cell site based on the determined value of the network capability parameter.

Figure 3:
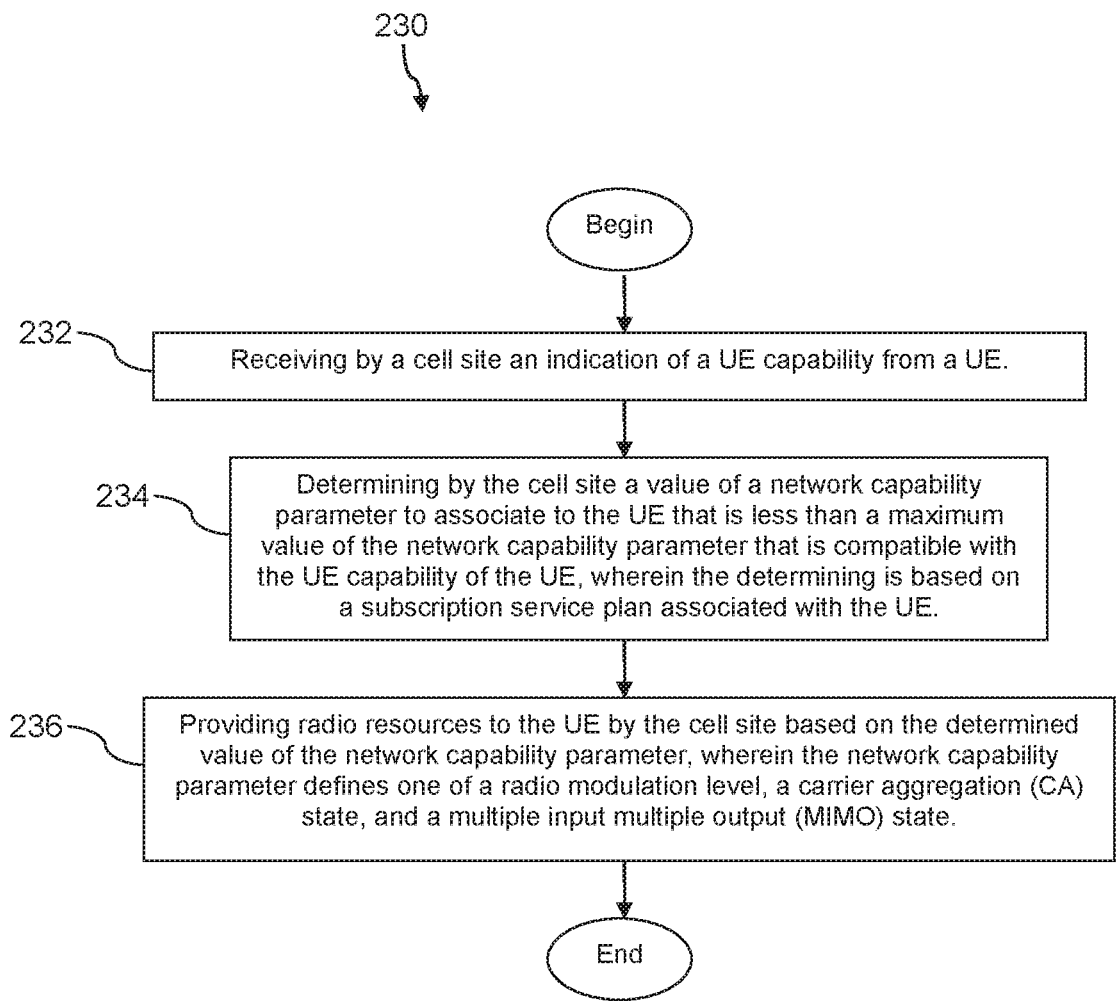
FIG. 3 is a flow chart of another method according to an embodiment of the disclosure.

Turning now to FIG. 3, a method 230 is described. In an embodiment, method 230 is a method of provisioning radio resources to a user equipment (UE) by a cell site. At block 232, the method 230 comprises receiving by a cell site an indication of a UE capability from a UE. At block 234, the method 230 comprises determining by the cell site a value of a network capability parameter to associate to the UE that is less than a maximum value of the network capability parameter that is compatible with the UE capability of the UE, wherein the determining is based on a subscription service plan associated with the UE.

At block 236, the method 230 comprises providing radio resources to the UE by the cell site based on the determined value of the network capability parameter, wherein the network capability parameter defines one of a radio modulation level, a carrier aggregation (CA) state, and a multiple input multiple output (MIMO) state.

Figure 4:
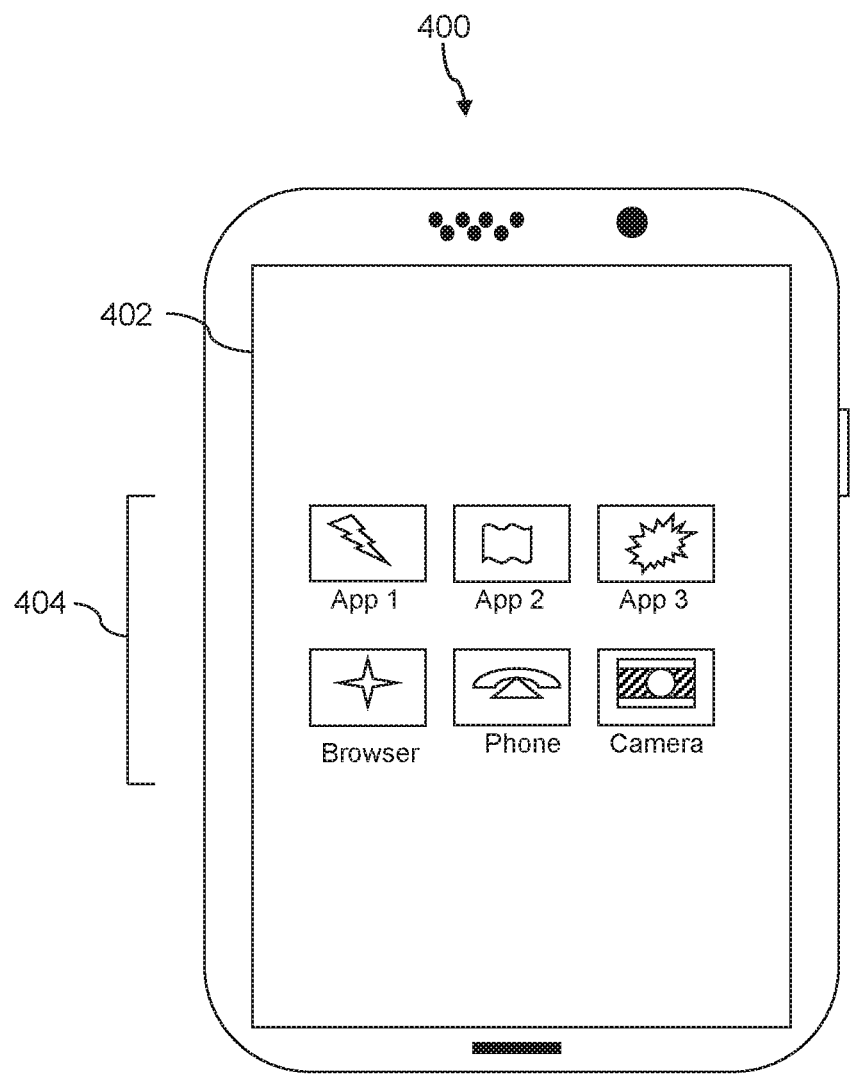
FIG. 4 is an illustration of a user equipment (UE) according to an embodiment of the disclosure.

FIG. 4 depicts the user equipment (UE) 400, which is operable for implementing aspects of the present disclosure, but the present disclosure should not be limited to these implementations. Though illustrated as a mobile phone, the UE 400 may take various forms including a wireless handset, a pager, a personal digital assistant (PDA), a gaming device, or a media player. The UE 400 includes a touch-screen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 5:
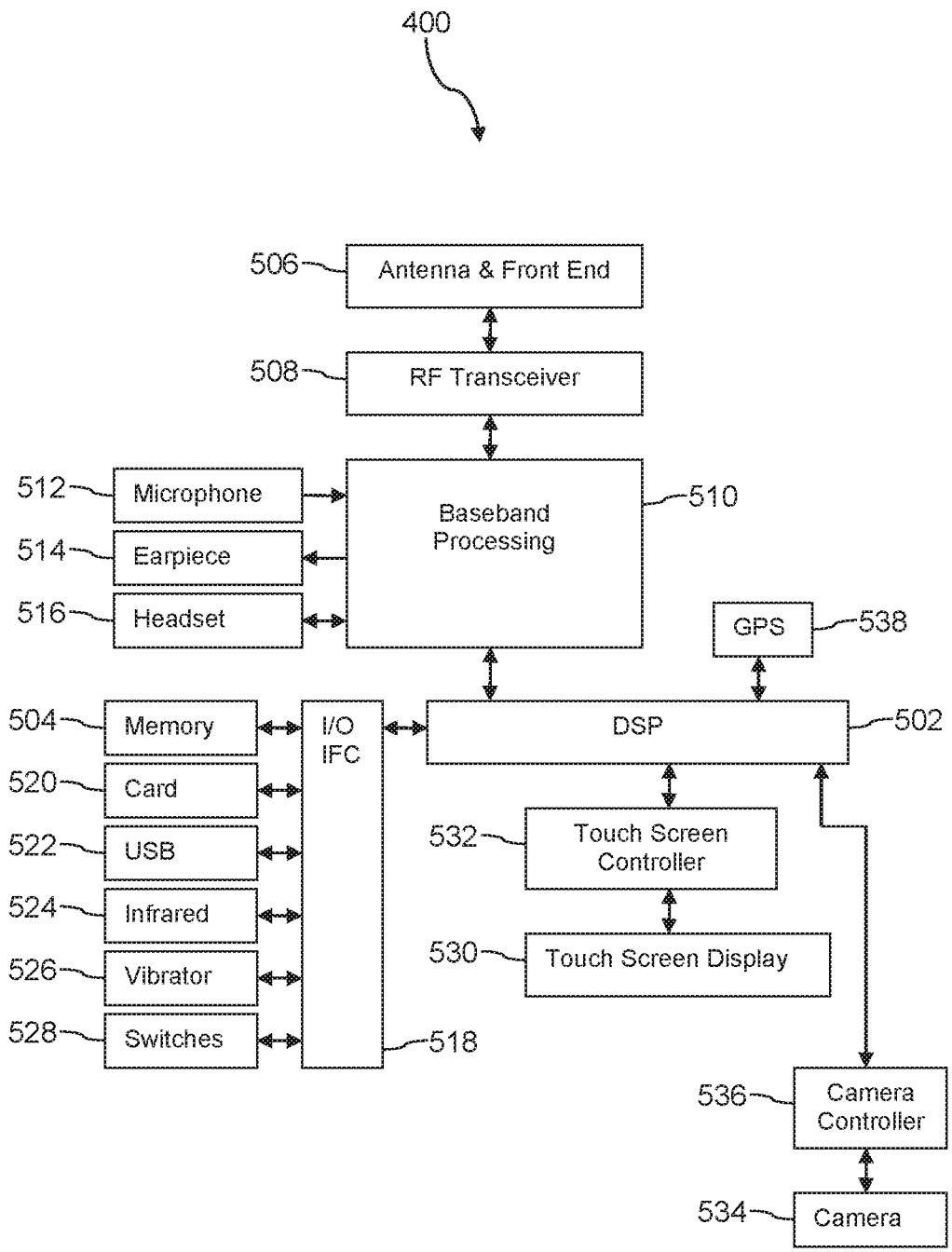
FIG. 5 is a block diagram of a hardware architecture of a UE according to an embodiment of the disclosure.

FIG. 5 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include one or more antenna and front end unit 506, a one or more radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen display 530, a touch screen controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby handsets and/or wireless base stations.

In an embodiment, one or more of the radio transceivers is a cellular radio transceiver. A cellular radio transceiver promotes establishing a wireless communication link with a cell site according to one or more of a 5G, a long term evolution (LTE), a code division multiple access (CDMA), a global system for mobile communications (GSM) wireless communication protocol. In an embodiment, one of the radio transceivers 508 may comprise a near field communication (NFC) transceiver. The NFC transceiver may be used to complete payment transactions with point-of-sale terminals or other communications exchanges. In an embodiment, each of the different radio transceivers 508 may be coupled to its own separate antenna. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface), for example coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

Figure 6A:
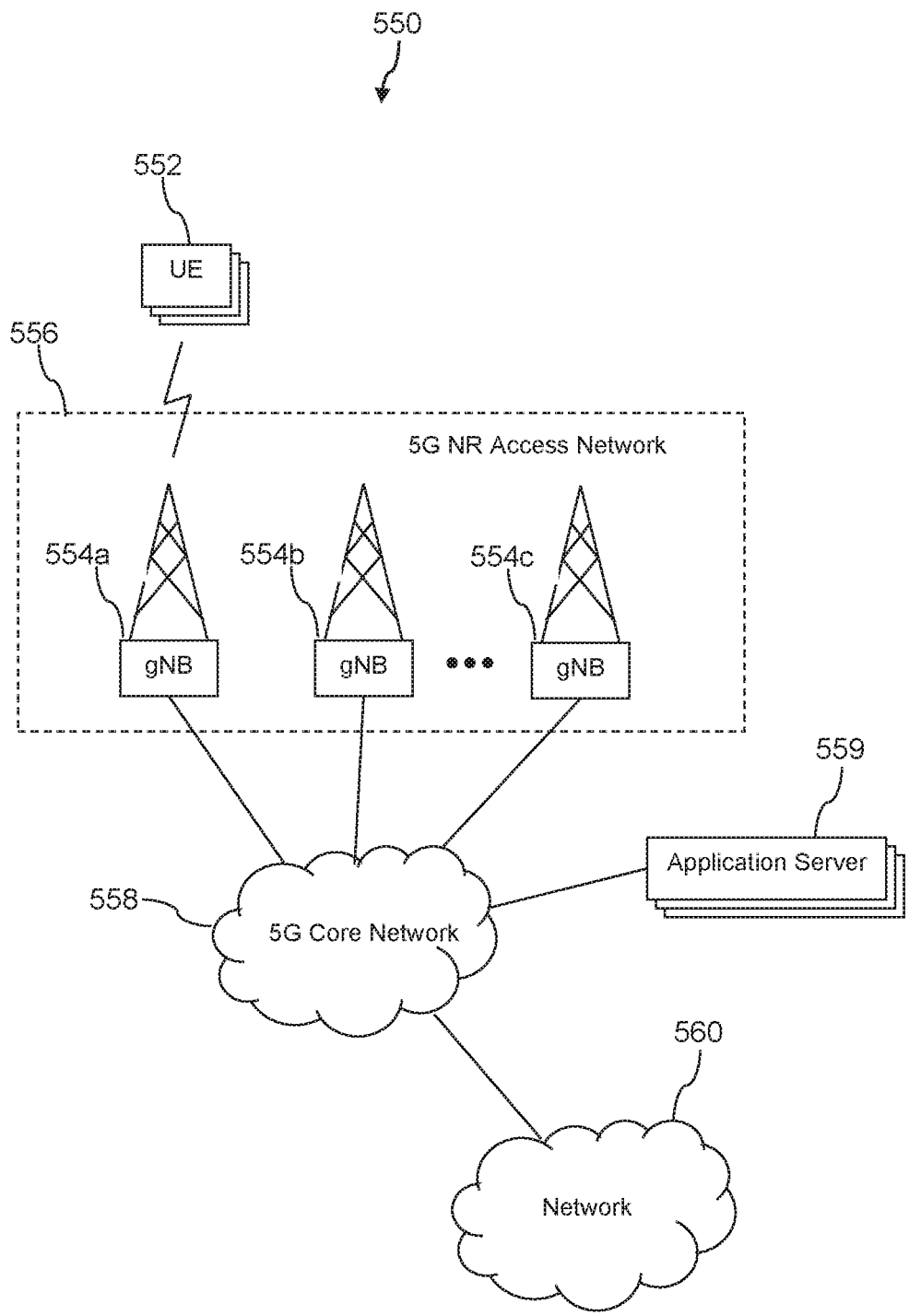
FIG. 6A and FIG. 6B are block diagrams of a 5G communication network according to an embodiment of the disclosure.

Turning now to FIG. 6A, an exemplary communication system 550 is described. In an embodiment, at least some of the communication system 100 described above with reference to FIG. 1 may be implemented in accordance with the communication system 550 described with reference to FIG. 6A and FIG. 6B. Typically the communication system 550 includes a number of access nodes 554 that are configured to provide coverage in which UEs 552 such as cell phones, tablet computers, machine-type-communication devices, tracking devices, embedded wireless modules, and/or other wirelessly equipped communication devices (whether or not user operated), can operate. The access nodes 554 may be said to establish an access network 556. The access network 556 may be referred to as a radio access network (RAN) in some contexts. In a 5G technology generation an access node 554 may be referred to as a gigabit Node B (gNB). In 4G technology (e.g., long term evolution (LTE) technology) an access node 554 may be referred to as an enhanced Node B (eNB). In 3G technology (e.g., code division multiple access (CDMA) and global system for mobile communication (GSM)) an access node 554 may be referred to as a base transceiver station (BTS) combined with a basic station controller (BSC). In some contexts, the access node 554 may be referred to as a cell site or a cell tower. In some implementations, a picocell may provide some of the functionality of an access node 554, albeit with a constrained coverage area. Each of these different embodiments of an access node 554 may be considered to provide roughly similar functions in the different technology generations.

In an embodiment, the access network 556 comprises a first access node 554*a*, a second access node 554*b*, and a third access node 554*c*. It is understood that the access network 556 may include any number of access nodes 554. Further, each access node 554 could be coupled with a core network 558 that provides connectivity with various application servers 559 and/or a network 560. In an embodiment, at least some of the application servers 559 may be located close to the network edge (e.g., geographically close to the UE 552 and the end user) to deliver so-called "edge computing." The network 560 may be one or more private networks, one or more public networks, or a combination thereof. The network 560 may comprise the public switched telephone network (PSTN). The network 560 may comprise the Internet. With this arrangement, a UE 552 within coverage of the access network 556 could engage in air-interface communication with an access node 554 and could thereby communicate via the access node 554 with various application servers and other entities.

The communication system 550 could operate in accordance with a particular radio access technology (RAT), with communications from an access node 554 to UEs 552 defining a downlink or forward link and communications from the UEs 552 to the access node 554 defining an uplink or reverse link. Over the years, the industry has developed various generations of RATs, in a continuous effort to increase available data rate and quality of service for end users. These generations have ranged from "1G," which used simple analog frequency modulation to facilitate basic voice-call service, to "4G"— such as Long Term Evolution (LTE), which now facilitates mobile broadband service using technologies such as orthogonal frequency division multiplexing (OFDM) and multiple input multiple output (MIMO).

Recently, the industry has been exploring developments in "5G" and particularly "5G NR" (5G New Radio), which may use a scalable OFDM air interface, advanced channel coding, massive MIMO, beamforming, mobile mmWave (e.g., frequency bands above 24 GHz), and/or other features, to support higher data rates and countless applications, such as mission-critical services, enhanced mobile broadband, and massive Internet of Things (IoT). 5G is hoped to provide virtually unlimited bandwidth on demand, for example providing access on demand to as much as 20 gigabits per second (Gbps) downlink data throughput and as much as 10 Gbps uplink data throughput. Due to the increased bandwidth associated with 5G, it is expected that the new networks will serve, in addition to conventional cell phones, general internet service providers for laptops and desktop computers, competing with existing ISPs such as cable internet, and also will make possible new applications in internet of things (IoT) and machine to machine areas.

In accordance with the RAT, each access node 554 could provide service on one or more radio-frequency (RF) carriers, each of which could be frequency division duplex (FDD), with separate frequency channels for downlink and uplink communication, or time division duplex (TDD), with a single frequency channel multiplexed over time between downlink and uplink use. Each such frequency channel could be defined as a specific range of frequency (e.g., in radio-frequency (RF) spectrum) having a bandwidth and a center frequency and thus extending from a low-end frequency to a high-end frequency. Further, on the downlink and uplink channels, the coverage of each access node 554 could define an air interface configured in a specific manner to define physical resources for carrying information wirelessly between the access node 554 and UEs 552.

Without limitation, for instance, the air interface could be divided over time into frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval (TTI), the resource elements on the downlink and uplink could be grouped to define physical resource blocks (PRBs) that the access node could allocate as needed to carry data between the access node and served UEs 552.

In addition, certain resource elements on the example air interface could be reserved for special purposes. For instance, on the downlink, certain resource elements could be reserved to carry synchronization signals that UEs 552 could detect as an indication of the presence of coverage and to establish frame timing, other resource elements could be reserved to carry a reference signal that UEs 552 could measure in order to determine coverage strength, and still other resource elements could be reserved to carry other control signaling such as PRB-scheduling directives and acknowledgement messaging from the access node 554 to served UEs 552. And on the uplink, certain resource elements could be reserved to carry random access signaling from UEs 552 to the access node 554, and other resource elements could be reserved to carry other control signaling such as PRB-scheduling requests and acknowledgement signaling from UEs 552 to the access node 554.

The access node 554, in some instances, may be split functionally into a radio unit (RU), a distributed unit (DU), and a central unit (CU) where each of the RU, DU, and CU have distinctive roles to play in the access network 556. The RU provides radio functions. The DU provides L1 and L2 real-time scheduling functions; and the CU provides higher L2 and L3 non-real time scheduling. This split supports flexibility in deploying the DU and CU. The CU may be hosted in a regional cloud data center. The DU may be co-located with the RU, or the DU may be hosted in an edge cloud data center.

Figure 6B:
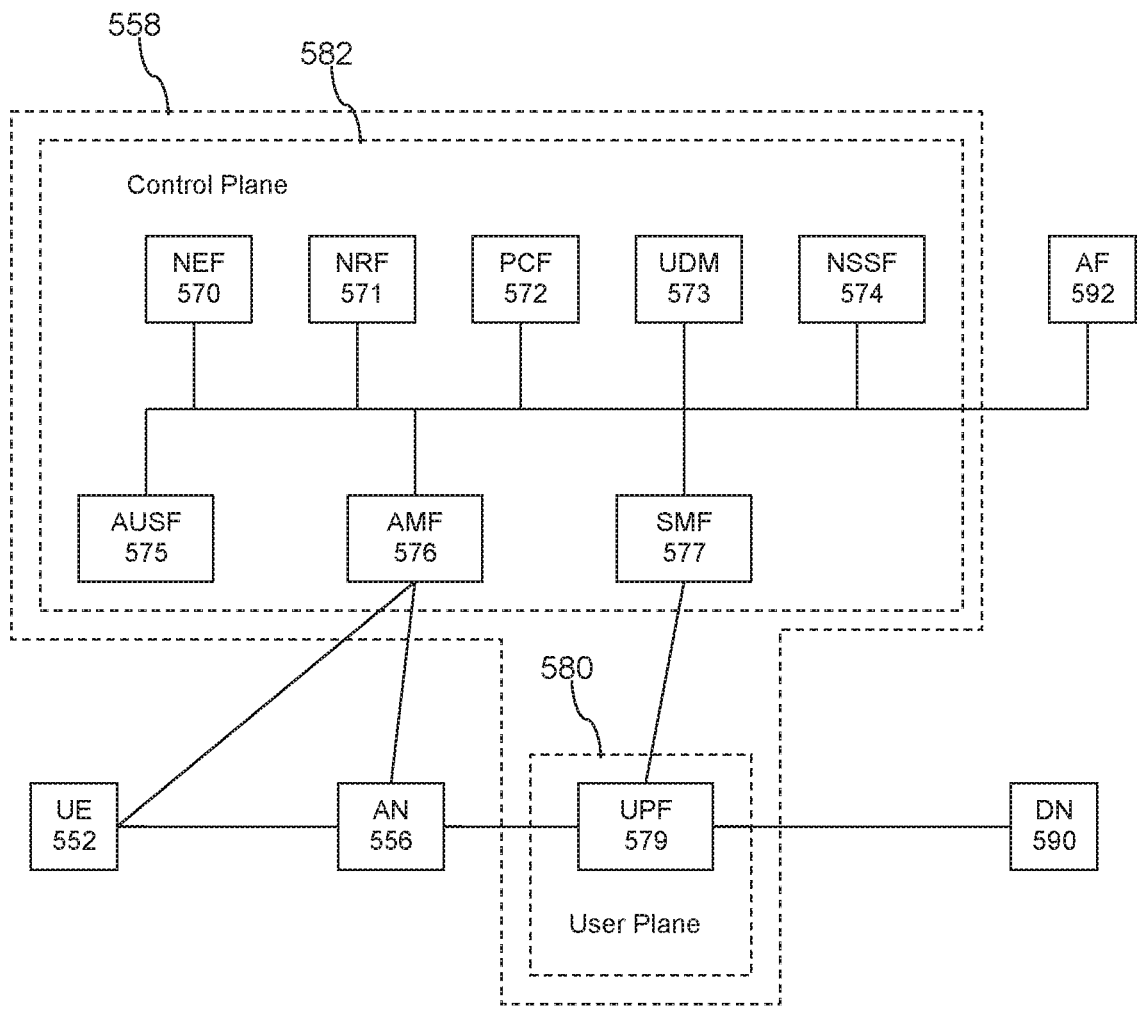

Turning now to FIG. 6B, further details of the core network 558 are described. In an embodiment, the core network 558 is a 5G core network. 5G core network technology is based on a service based architecture paradigm. Rather than constructing the 5G core network as a series of special purpose communication nodes (e.g., an HSS node, a MME node, etc.) running on dedicated server computers, the 5G core network is provided as a set of services or network functions. These services or network functions can be executed on virtual servers in a cloud computing environment which supports dynamic scaling and avoidance of long-term capital expenditures (fees for use may substitute for capital expenditures). These network functions can include, for example, a user plane function (UPF) 579, an authentication server function (AUSF) 575, an access and mobility management function (AMF) 576, a session management function (SMF) 577, a network exposure function (NEF) 570, a network repository function (NRF) 571, a policy control function (PCF) 572, a unified data management (UDM) 573, a network slice selection function (NSSF) 574, and other network functions. The network functions may be referred to as virtual network functions (VNFs) in some contexts.

Network functions may be formed by a combination of small pieces of software called microservices. Some microservices can be re-used in composing different network functions, thereby leveraging the utility of such microservices. Network functions may offer services to other network functions by extending application programming interfaces (APIs) to those other network functions that call their services via the APIs. The 5G core network 558 may be segregated into a user plane 580 and a control plane 582, thereby promoting independent scalability, evolution, and flexible deployment.

The UPF 579 delivers packet processing and links the UE 552, via the access network 556, to a data network 590 (e.g., the network 560 illustrated in FIG. 6A). The AMF 576 handles registration and connection management of non-access stratum (NAS) signaling with the UE 552. Said in other words, the AMF 576 manages UE registration and mobility issues. The AMF 576 manages reachability of the UEs 552 as well as various security issues. The SMF 577 handles session management issues. Specifically, the SMF 577 creates, updates, and removes (destroys) protocol data unit (PDU) sessions and manages the session context within the UPF 579. The SMF 577 decouples other control plane functions from user plane functions by performing dynamic host configuration protocol (DHCP) functions and IP address management functions. The AUSF 575 facilitates security processes.

The NEF 570 securely exposes the services and capabilities provided by network functions. The NRF 571 supports service registration by network functions and discovery of network functions by other network functions. The PCF 572 supports policy control decisions and flow based charging control. The UDM 573 manages network user data and can be paired with a user data repository (UDR) that stores user data such as customer profile information, customer authentication number, and encryption keys for the information. An application function 592, which may be located outside of the core network 558, exposes the application layer for interacting with the core network 558. In an embodiment, the application function 592 may be execute on an application server 559 located geographically proximate to the UE 552 in an "edge computing" deployment mode. The core network 558 can provide a network slice to a subscriber, for example an enterprise customer, that is composed of a plurality of 5G network functions that are configured to provide customized communication service for that subscriber, for example to provide communication service in accordance with communication policies defined by the customer. The NSSF 574 can help the AMF 576 to select the network slice instance (NSI) for use with the UE 552.

Figure 7A:
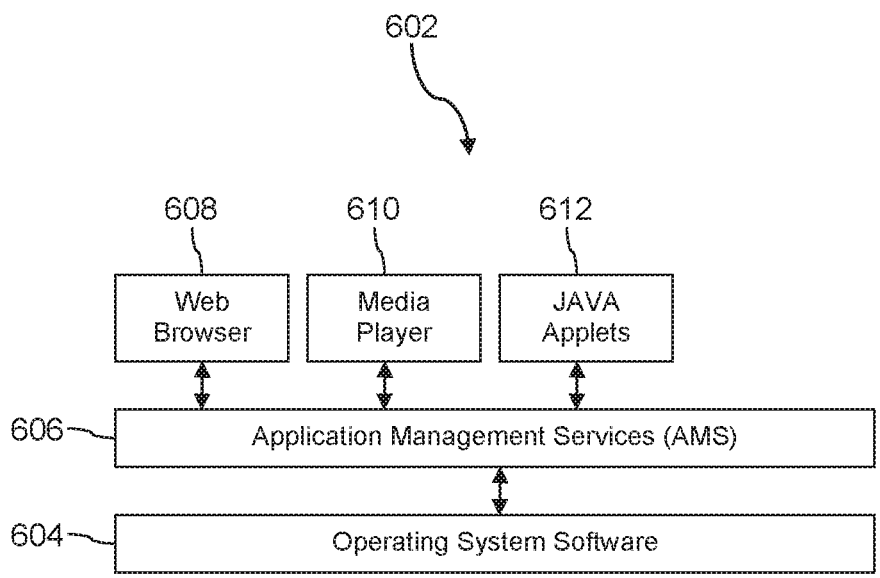
FIG. 7A is a block diagram of a software architecture of a UE according to an embodiment of the disclosure.

FIG. 7A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 7A are a web browser application 608, a media player application 610, and JAVA applets 612. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality.

Figure 7B:
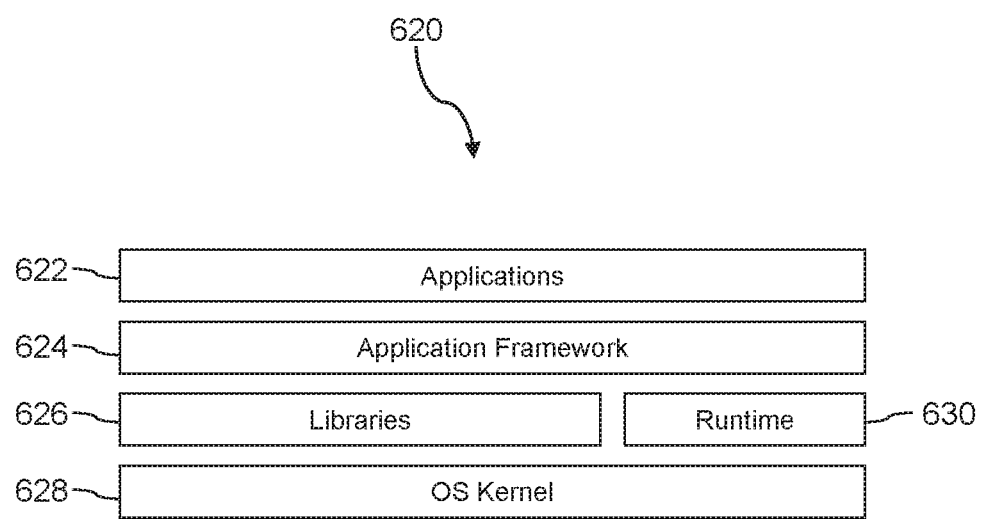
FIG. 7B is a block diagram of another software architecture of a UE according to an embodiment of the disclosure.

FIG. 7B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 8:
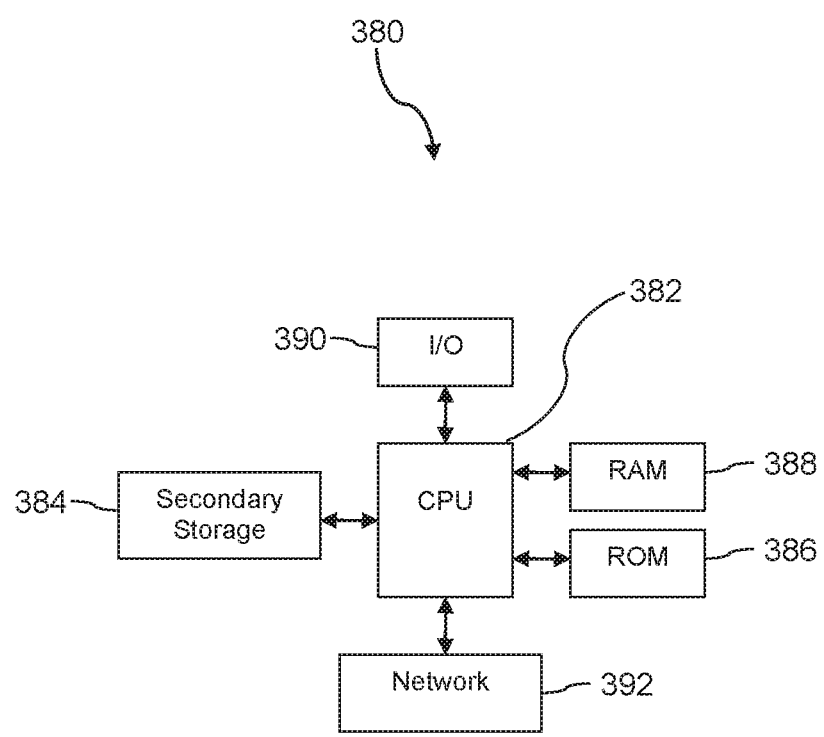
FIG. 8 is a block diagram of a computer system according to an embodiment of the disclosure.

FIG. 8 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/ or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), and radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A user equipment (UE), comprising:
   a radio transceiver;
   a processor coupled to the radio transceiver;
   a non-transitory memory coupled to the processor; and
   a service selection application stored in the non-transitory memory that, when executed by the processor:
   analyzes a history of data usage of the UE while executing an application,
   based on the analysis of the history of data usage, estimates a future data usage when executing the application by the UE,
   estimates a data service price based on the estimate of future data usage when executing the application, a time of day, a day of week, and a location of the UE,
   presents a user interface presenting a plurality of different network capability parameter values and for each UE network capability parameter value presents a data service price based on the estimated data service price,
   receives a user input selecting one of the network capability parameter values, and
   transmits an indication of the user selected network capability parameter value to a serving cell site, whereby the UE promotes a user controlling radio resource allocation by the cell site to the UE in a range from a maximum radio resource allocation consistent with a maximum UE capability of the UE to a minimum radio resource allocation supported by the cell site.

2. The UE of claim 1, wherein the UE transmits an indication of UE capability to the serving cell site that identifies a chipset installed in the UE.

3. The UE of claim 1, wherein the UE transmits an indication of UE capability to the service cell that identifies an antenna configuration of the UE.

4. The UE of claim 1, wherein the UE transmits an indication of UE capability to the serving cell site that identifies a maximum quadrature amplitude modulation (QAM) constellation capability of the UE.

5. The UE of claim 1, wherein the UE transmits an indication of UE capability to the serving cell site that identifies a radio frequency bands supported by the UE.

6. The UE of claim 1, wherein the user interface presents an opt-in and opt-out control.

7. The UE of claim 1, wherein the UE is a mobile phone, a smart phone, a personal digital assistant (PDA), a wearable computer, a headset computer, a laptop computer, a tablet computer, or a notebook computer.

* * * * *